Jan. 3, 1961 G. E. FORSYTH 2,966,840
DOUGHNUT MAKING MACHINE
Filed Aug. 8, 1958 5 Sheets-Sheet 1

INVENTOR.
GALEN E. FORSYTH
BY *Victor J. Evans & Co.*
ATTORNEYS

Jan. 3, 1961  G. E. FORSYTH  2,966,840
DOUGHNUT MAKING MACHINE
Filed Aug. 8, 1958  5 Sheets-Sheet 2

INVENTOR.
GALEN E. FORSYTH
BY Victor J. Evans & Co.
ATTORNEYS

Jan. 3, 1961 G. E. FORSYTH 2,966,840
DOUGHNUT MAKING MACHINE
Filed Aug. 8, 1958 5 Sheets-Sheet 3

INVENTOR.
GALEN E. FORSYTH
BY Victor J. Evans &Co.
ATTORNEYS

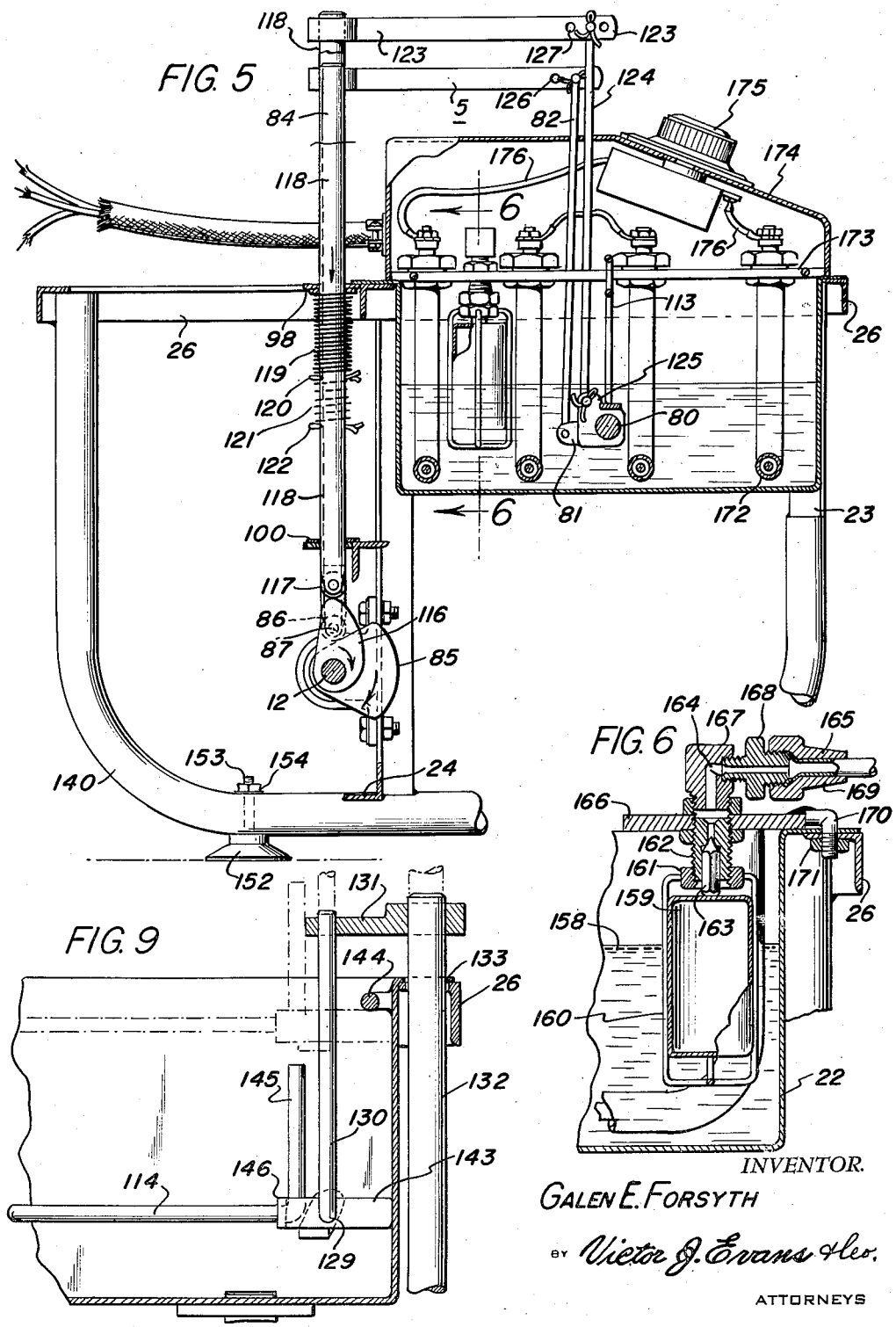

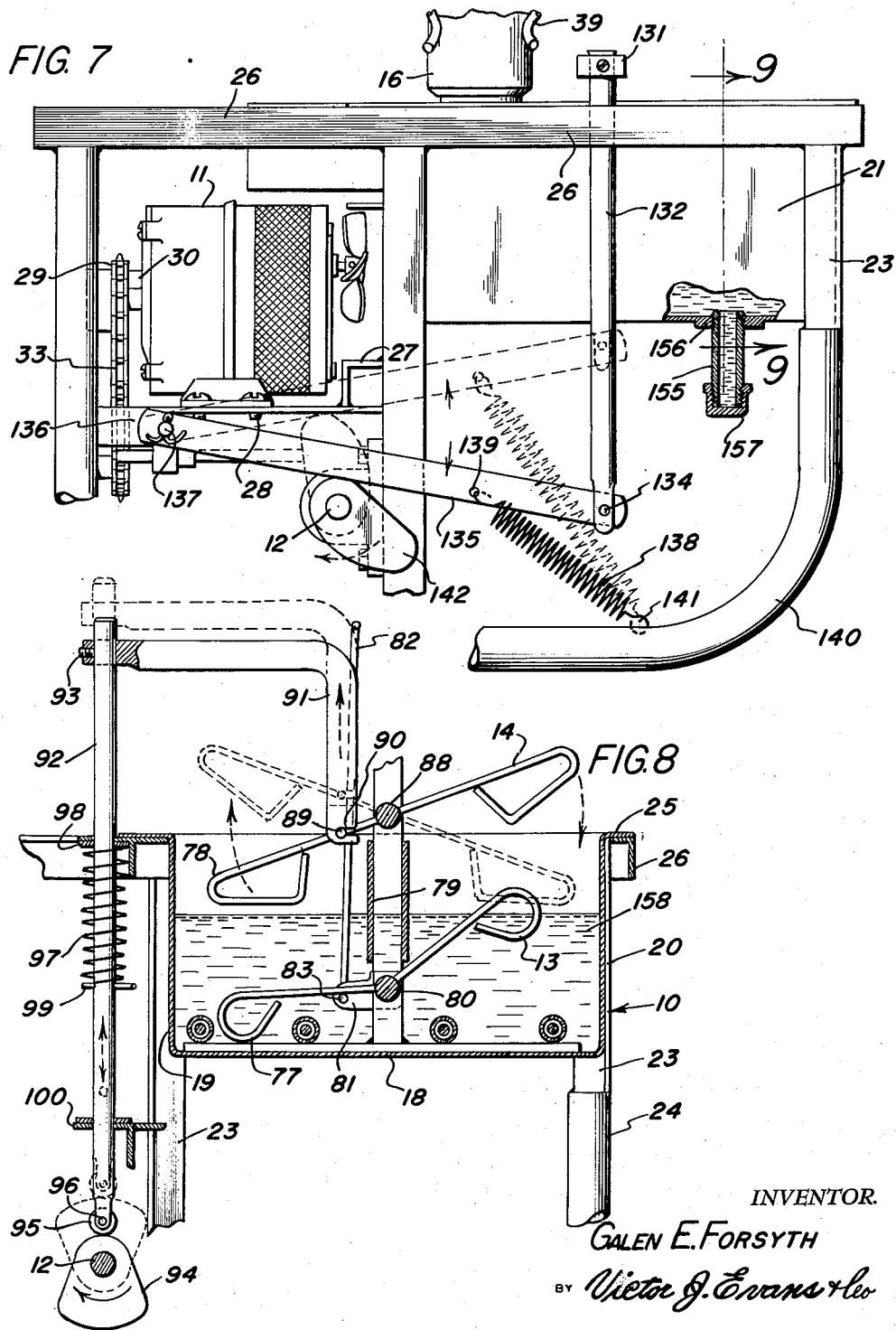

United States Patent Office 2,966,840
Patented Jan. 3, 1961

2,966,840

DOUGHNUT MAKING MACHINE

Galen E. Forsyth, 1914 E. 5th, Little Rock, Ark.

Filed Aug. 8, 1958, Ser. No. 754,023

6 Claims. (Cl. 99—354)

This invention relates to machines for forming and cooking or frying doughnuts wherein doughnut dough in a hopper having a funnel-shaped lower end is formed into rings which are dropped into hot oil in a rectangular-shaped utensil and wherein the doughnuts are conveyed, turned over, and removed from the hot oil by mechanical means; and in particular a doughnut machine wherein doughnut forming rings of dough are deposited into hot oil in a utensil, rectangular-shaped in plan and having a longitudinally disposed partition positioned midway of the side walls thereof, are conveyed in intermittent stages longitudinally on one side of the partition, turned over at the end of the partition and conveyed on the opposite side thereof also in intermittent stages to a point from which the finished doughnuts are removed from the hot oil by a pivotally mounted and cam actuated spatula or the like.

The purpose of this invention is to provide a doughnut making machine in which the doughnuts are held stationary for short periods of time to facilitate complete cooking or frying thereof.

The object of this invention is, therefore, to provide means for conveying rings of dough for doughnuts through hot oil or the like wherein the dough is moved with a series of intermittent actions.

Another object of the invention is to provide means for dropping rings of dough in a doughnut making machine wherein the dropping action is synchronized with the time required for cooking or frying the doughnuts as the doughnuts travel through the cooking fluid at regular intervals.

Another important object of the invention is to provide a doughnut making machine wherein doughnuts are conveyed through a cooking or frying medium in which the doughnuts are turned at the midway point of travel through the machine.

A further object of the invention is to provide a doughnut making machine wherein doughnut forming rings of dough are conveyed through hot oil or the like by pivotally mounted fingers in which the fingers operate with a reciprocating action moving one ring through a predetermined distance and returning and picking up another ring which moves through the same distance.

A still further object of the invention is to provide an automatic doughnut making machine which is of a simple and economical construction.

With these and other objects and advantages in view the invention embodies a doughnut making machine having an elongated trough or utensil, rectangular-shaped in cross section, and having a longitudinally disposed partition spaced midway between the sides with a dough retaining hopper having a funnel-shaped doughnut forming ring ejector extended from the lower end positioned to drop rings of dough into one side of the trough, fingers pivotally mounted in the trough and positioned above the partition, means for rocking and reciprocating the fingers whereby the fingers move rings of dough along one side of the trough and return the rings on the opposite side, an open spatula for turning rings of dough and moving the rings from one side of the machine to the other, and another open spatula for removing the finished doughnuts from the trough.

Other features and advantages will appear from the following description taken in connection with the drawings, wherein:

Figure 5 is a cross section through one end of the machine taken on line 5—5 of Figure 1 showing the terminal box from which the heating elements of the machine extend, and also showing a float for regulating the amount of fluid in the trough of the machine.

Figure 6 is a longitudinal section through one end of the trough of the machine taken on line 6—6 of Figure 5 showing, in particular, a float valve for controlling the elevation of liquid in the trough.

Figure 7 is an end elevational view of the machine looking toward the end in which the motor is positioned showing the mounting of the motor and also the chain connection of the motor to the transmission elements.

Figure 8 is a cross section through the machine taken on line 8—8 of Figure 1 showing the hot oil retaining trough with the pivotally mounted reciprocating fingers for moving the doughnuts through the trough.

Figure 9 is a section through a portion of the machine taken on line 9—9 of Figure 7 showing the mounting of doughnut elevating elements at the end of the trough.

Figure 13 is a view showing a wiring diagram for supplying electric current through the operating motor and heating elements with the circuit of the heating elements provided with a thermostat.

Figure 14 is a sectional plan taken on line 14—14 of Figure 11 with the parts shown on an enlarged scale showing the mounting of a rod for controlling the doughnut dough forming plungers.

Figure 1:
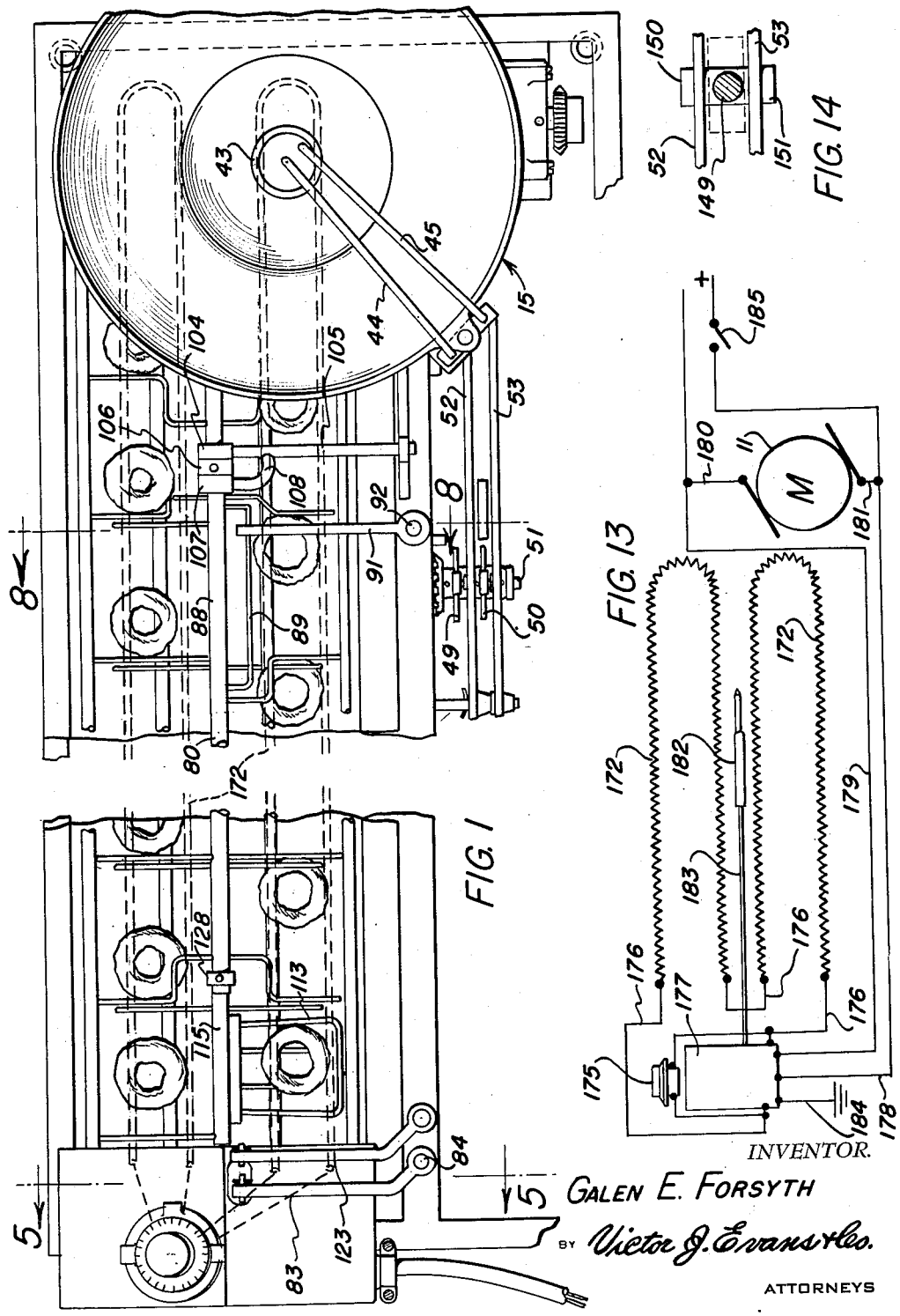
Figure 1 is a plan view of the doughnut making machine showing the machine with parts broken away and illustrating the travel of doughnuts through the machine.

Referring now to the drawings wherein like reference characters denote corresponding parts the improved doughnut making machine of this invention includes a trough 10, a motor 11, a main shaft 12 extended longitudinally of the machine, lower fingers 13, as shown in Figure 8, for retaining the doughnuts in spaced relation as upper fingers 14 are moved forwardly and a hopper 15 for retaining dough from which doughnut forming rings are discharged through a neck 16 depending from a funnel portion 17 of the hopper.

The trough 10 is provided with a base 18, side walls 19 and 20 and end walls 21 and 22 and the trough is supported on legs having angle bar upper portions 23 and tubular lower portions connected by longitudinally disposed rails 24. The side and end walls are provided with extended flanges 25 that are positioned on upper surfaces of angle bars 26, as shown in Figure 8.

Figures 2, 3:
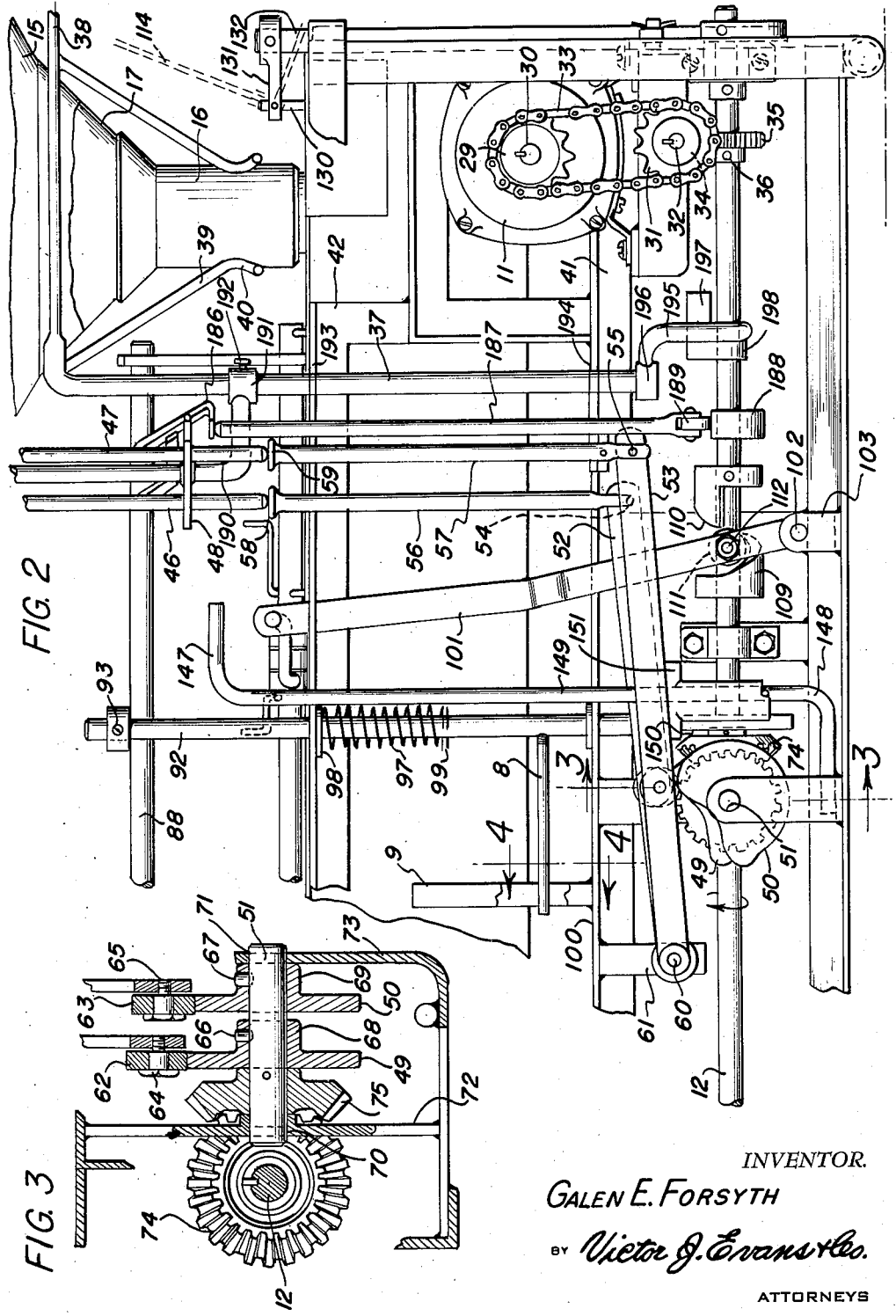
Figure 2 is an elevational view looking toward the rear of the machine with parts broken away showing the end of the machine upon which the dough hopper is positioned.
Figure 3 is a cross section through the portion of the machine taken on line 3—3 of Figure 2 with other parts omitted showing gear actuating cams for operating the dough ejecting elements of the hopper.

The parts are operated by the motor 11 which is mounted on a transversely disposed strut 27 by screws 28 as shown in Figure 7, wherein as illustrated in Figures 2 and 7 a sprocket 29 on the motor shaft 30 is aligned with a sprocket 31 on a countershaft 32 whereby the shaft 32 is driven from the motor by a chain 33, trained over the sprockets. The countershaft 32 drives the main shaft 12 through a worm 34 and the worm gear 35, the worm 34 being positioned on the shaft 32 and the worm gear 35 being mounted on the main shaft 12. The worm gear 35 is secured in position by a set screw 36.

The hopper 15 is supported from the frame of the machine by a post 37, on the upper end of which is a ring 38 that extends around the funnel-shaped portion of the hopper and the ring 38 is provided with depending fingers 39 that are formed with arcuate lower ends 40 which contact the outer surface of the neck 16 depending from the funnel-shaped section 17 of the hopper. The post 37 is supported from a longitudinally disposed bar 41, at the lower end and by a bar 42, spaced from the upper end. The bars 41 and 42 are angle bars having vertically disposed legs and horizontally disposed arms and the post 37 extends through and is rotatably mounted in the horizontally disposed arms of the bars.

The doughnut forming rings of dough are extruded through the neck 16 of the hopper 15 as illustrated in Patent No. 2,669,949 and the plungers 43 which are suspended by arms 44 and 45 secured to upper ends of rods 46 and 47 slidably mounted by a plate 48 on the post 37 are actuated by cams 49 and 50 on a cam shaft 51 through levers 52 and 53, as shown in Figure 2.

The plate 48 is supported from the post 37 by an arm 190 which extends from a hub 191 that is secured on the post 37 by a set screw 192. The post 37 is rotatably mounted in an opening in the horizontal arm 193 of the angle iron 42 and also in an opening in the horizontal arm 194 of the lower angle bar 41. The lower end of the post 37 is provided with an arcuate arm 195 that extends from a hub 196 on the lower end of the post 37 and that is positioned to be engaged by a cam 197 of a hub 198 on a shaft 12. The levers 52 and 53 are pivotally connected by pins 54 and 55, respectively to lower ends of the rods 56 and 57 on the upper ends of which are discs 58 and 59 on which the lower ends of the rods 46 and 47 rest. The levers 52 and 53 are pivotally mounted by a pin 60 in a bracket 61, and rollers 62 and 63 which are mounted on the levers by shoulder screws 64 and 65, respectviely, ride on upper surfaces of the cams 49 and 50. The cams 49 and 50 are secured on the shaft 61 by set screws 66 and 67 which extend through a hub 68 of the cam 49 and the hub 69 of the cam 50. The shaft 51, which is rotatably mounted in bearings 70 and 71 of plates 72 and 73 is rotated by a beveled gear 74 mounted on the shaft 12 and meshing with a beveled gear 75 on the shaft 51, as shown in Figure 3.

The positions of the cams 49 and 50 are readily adjusted to operate the plungers 43 to extrude rings of dough that drop from the neck 16 into hot oil, or the like as indicated by the numeral 76.

With the plungers mounted and operated in this manner rings of doughnut forming dough are dropped at spaced intervals into the cooking or frying fluid and the amount of dough and the spacing or timing of the intervals are regulated by the cams.

The dough rings rest upon the liquid in the trough and are retained in spaced relation by the lower fingers on the inner side of the trough, the fingers on the inner side being indicated by the numeral 77 which, in Figure 8, are shown in the lower positions in which the fingers do not engage the dough rings. With the fingers in the position indicated by the numeral 77 the upper fingers 78 of the inner trough are moved longitudinally whereby the dough rings are moved a distance equal to the spacing of the fingers and after motion of the dough rings the distance between fingers the positions of the fingers are reversed with the upper fingers 14 and 78 assuming positions as indicated by the broken lines, and with the lower fingers 77 moving upwardly to positions similar to the positions of the lower fingers 13, but on the opposite side of the trough. By this means the doughnut rings are retained in pockets formed by two of the fingers, the side wall 19 and the inner wall 79 of the partition extended longitudinally through the trough.

The lower fingers 13 and 77 are carried by the longitudinally disposed rod 80 from which an arm 81 extends and the extended end of the arm 81 is connected to a rod 82 by a pin 83. The upper end of the rod 82 is pivotally connected to an arm 5 mounted on the upper end of a rod 84 which is actuated by a cam 85 on the shaft 12 through a roller 86 whereby upon rotation of the cam 85 the roller 86 rotatably mounted in the lower end of the rod 84 moves the arm 5 and rod 82 upwardly rotating the shaft 80 whereby the lower fingers 13 and 77 are actuated from the position shown in Figure 8 to a reverse position wherein the fingers 13 extend downwardly and fingers 77 upwardly.

The upper fingers 14 and 78 are carried by a pivotally mounted rod 88 that is positioned above the upper edge of the partition of the trough and the rod 88 is provided with a loop 89 that extends into a notch 90 in the lower end of an L-shaped arm 91 that is secured on the upper end of a rod 92 by a set screw 93 wherein, as illustrated in Figure 8, the rod 92 is actuated by a cam 94 on the shaft 12 whereby upon rotation of the shaft 12 the roller 95 pivotally mounted by a pin 96 on the lower end of the rod 92 moves the rod 92 upwardly compressing a spring 97 whereby the upper fingers 14 and 78 move from the position shown in full lines in Figure 8 to the position shown in broken lines. The spring 97 is positioned between the frame member 98 and a pin 99 extended through the rod, and the lower portion of the rod is slidably mounted in a frame member 100.

The rod 88 upon which the upper fingers are carried is reciprocated longitudinally by a lever 101, as shown in Figure 2, pivotally mounted by a pin 102 in a bracket 103 and operatively connected to the rod 88 by a hub 104 at the end of an arm 105 which is positioned on one side of a set collar 106, on the opposite side of which is a hub 107 at the end of a brace 108.

The lever 101 is actuated by cams 109 and 110 that are positioned to contact a roller 111 mounted on the lever 101 with a bolt 112. Upon rotation of the shaft 12 the cams move the lever 101 from the position shown in full lines in Figure 2 to the end of the machine upon which the hopper 15 and motor 11 are positioned and in this movement the upper fingers 14 and 78 travel toward the end of the machine from which the doughnuts are discharged.

The movement of the lever 101 follows movement of the arm 91 whereby after moving upwardly wherein the arm 91 moves the fingers 14 and 78 from the position shown in full lines in Figure 8 to that shown in broken lines the fingers 14 dip into the trough and with the fingers in the lower position the lever 101 moves the shaft and fingers carrying the doughnuts on the surface of the liquid through one stage of their travel through the machine. In this movement the fingers 13 are in lower positions so that the doughnuts are free to travel on the surface of the liquid. Just before the return movement of the lever 101 of the shaft 88 and fingers 14 and 78 the cam 94 reverses the positions of the upper fingers to the position shown in full lines in Figure 8 or by the fingers 78 to drive the doughnut forming rings of dough toward the end of the machine opposite to that on which the dough hopper is positioned.

The rod 92 is provided with a pin 8 that extends into a loop 9 extended upwardly from the frame member 100 to prevent rotation of the rod 92 so that the arm 91 will be retained in a transversely disposed position across the machine.

The doughnuts are moved from the section of the trough in which the fingers 77 and 78 are positioned to the section in which the fingers 13 and 14 are positioned by an open spatula 113 and discharged from the end of the trough in which the fingers 13 and 14 are positioned by a similar spatula 114. The spatula 113 is carried by a shaft 115, as shown in Figure 5 and actuated by a cam 116 which engages a roller 117 on the lower end of a rod 118 that is slidably mounted in the frame 98 in which the rod 92 is also slidably mounted. The lower portion of the rod is also slidably mounted in the frame member 100 which retains the rod in a vertically disposed position. The rod is urged downwardly by a spring 119 positioned between the frame member 98 and a cotter pin 120 extended through the rod. A similar spring 121 on the rod 84 which is positioned between the frame member 98 and a cotter pin 122 urges the rod 84 downwardly whereby the roller 86 in the lower end follows the cam 85.

The upper end of the rod 118 is provided with an arm 123 that is connected by a rod 124 to an arm 125 extended from the shaft 115 on which the spatula 113 is mounted wherein with upward movement of the rod 118 by the cam 116 the spatula 113 is moved from the position shown in dotted lines in Figure 5 to that shown in full lines wherein a doughnut is moved upwardly from the hot oil in one side of the trough, turned over and deposited in the oil in the opposite side of the trough. The extended ends of the arms 83 and 123 are provided with spaced openings 126 and 127, respectively to provide adjustments in the movements of the lower fingers and spatula. The tubular shaft or sleeve 115 on which the spatula 113 is mounted is retained in position on the shaft 88 by a set collar 128.

The spatula 114 is pivotally mounted by a pin 129 extended from the lower end of a rod 130 carried by an arm 131 extended from a rod 132 slidably mounted in an opening 133 in the angle bar 26 on the end wall of the trough, as shown in Figure 9, and, as shown in Figure 7 the lower end of the rod 132 is pivotally mounted by a pin 134 on the end of a lever 135 that is pivotally mounted on a frame member 136 by a pin 137. The lever 135 is resiliently urged downwardly by a spring 138, one end of which is secured in an opening 139 with the lever 135 and the opposite end of which is secured to a support bar 140 of the trough supporting frame as shown at the point 141. The lever 135 is moved upwardly by a cam 142 mounted on the shaft 12 and the position of the cam is such that the upward movement of the lever 135 and rod 132 is synchronized with the arrival of a doughnut in the end position whereby, as a doughnut moves over the spatula, with the spatula in the lower position, as shown in Figure 9, the spatula is moved upwardly vertically with the spatula in a horizontal position until an extended arm 143 of the spatula engages a rod 144 extended from the inner surface of the end wall wherein upon engaging the rod 144 the arm 143 is moved downwardly, pivoting on the pin 129 whereby the outer portion of the spatula travels upwardly to the position shown in Figure 10 wherein a doughnut slides against tines 145 to prevent the doughnut from passing from the spatula. The tines 145 are extended from mounting bar 146 of the spatula. In this movement the doughnut is picked from the hot oil, carried upwardly and dropped over the end wall of the trough with the spatula in the position shown in Figure 10. As the movement of the cam 142 continues, moving from the position shown in broken lines in Figure 7 to that shown in full lines the spatula 114 which is carried by the rod 132, moves downwardly to a doughnut receiving position in the lower part of the end of the trough.

Figure 12:
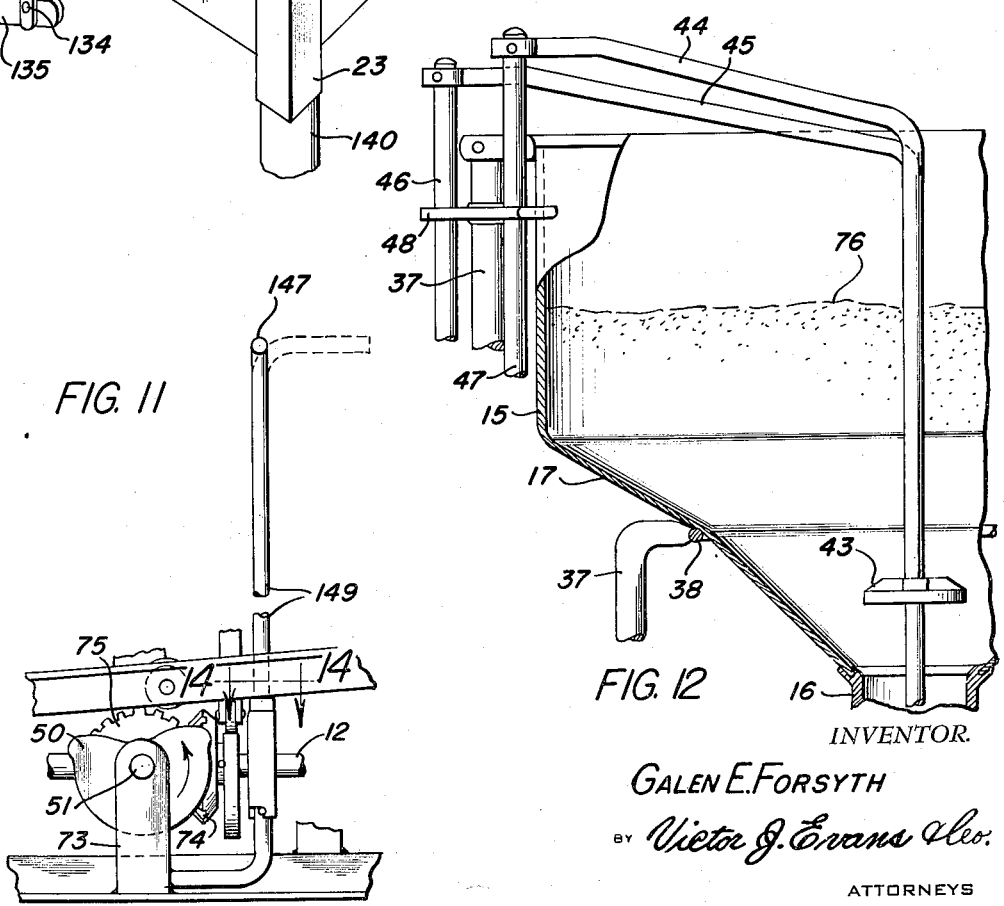
Figure 12 is a cross-section through a portion of the machine showing the dough retaining hopper with the dough ring injecting plunger in the lower end and with part of the hopper broken away.
Figure 11:
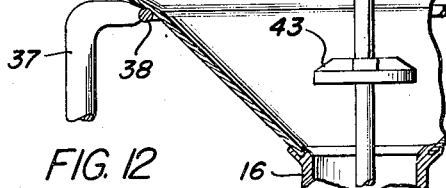
Figure 11 is a longitudinal sectional view showing the cam assembly for actuating the dough ring discharging plungers with parts omitted and other parts broken away.

The machine is provided with a manually actuated release lever 147 that is rotatably mounted on the upper end of an L-shaped support or rod 148, and a vertically disposed portion 149 of the lever 147 is provided with arms 150 and 151 which are turned by the lever 147 to positions below the levers 52 and 53, as shown in Figure 12, so that when it is desired to discontinue use of the machine the dough operating plungers 43 may be held stationary, until oil in the trough is heated to a predetermined degree and without dropping additional doughnut forming dough until the rings of dough in the machine are exhausted.

As illustrated in Figures 7 and 8 the angle iron support members of the trough and particularly the members at the ends of the outer side wall of the trough, such as the members 23 that extend from the ends of the tubular support members 24 are supported by the members 24 which merge into the sections 140 that extend across the base as shown in Figure 5 and upwardly to the extended end of the angle bars 26 at the upper end of the frame. The support members 140 may be provided with vacuum cups 152 that are secured in position by studs 153 with nuts 154 thereon whereby the device may be retained in position on a flat surface, such as a shelf or table top, as may be desired.

The base 18 of the trough is provided with an outlet or cleaning nipple 155 that is secured in a boss 156 on the base as shown in Figure 7 and the lower end of the nipple is provided with a threaded cap 157.

The hot oil or other liquid, which is indicated by the numeral 158 is retained at a constant level with a float 159 in a cage 160 secured by a nut 161 threaded on a nipple 162 in which a float actuated valve 163 is positioned. The valve 163 is positioned in the nipple 162 and intercepts a passage 164 extended through an inlet connection 165 that may extend to a supply container or the like. The nipple 162 is threaded in an opening in a plate 166 and the passage 164 extends through a fitting 167 a union 168 and a coupling 169. As the liquid level in the trough drops, the float 159 moves downwardly, opening the valve 163 whereby additional oil is supplied through the passage 164 to the trough. When the desired level is reached, the float 159 is moved upwardly, closing the valve 163 and thereby retaining the hot oil at a substantially constant level. The plate 166 is secured to one of the angle iron frame members 26 by a stud 170 which is secured in the frame member by a nut 171.

The lower part of the trough is provided with heating elements 172 as shown in Figures 1 and 5 which are suspended from a bar 173 in a cover 174 and electric current to the heating elements is controlled by a manually actuated switch 175 to which the elements are connected by wires 176.

The switch 175 is provided with a rheostat 177 which is connected by wires 178 and 179 to a source of current supply and the terminals of the motor 11 are connected to the wires 178 and 179 with connections 180 and 181. The rheostat is connected to a bimetal element 182 by a wire 183 and the rheostat may be connected to a ground by a wire 184.

*Operation*

Figure 10:
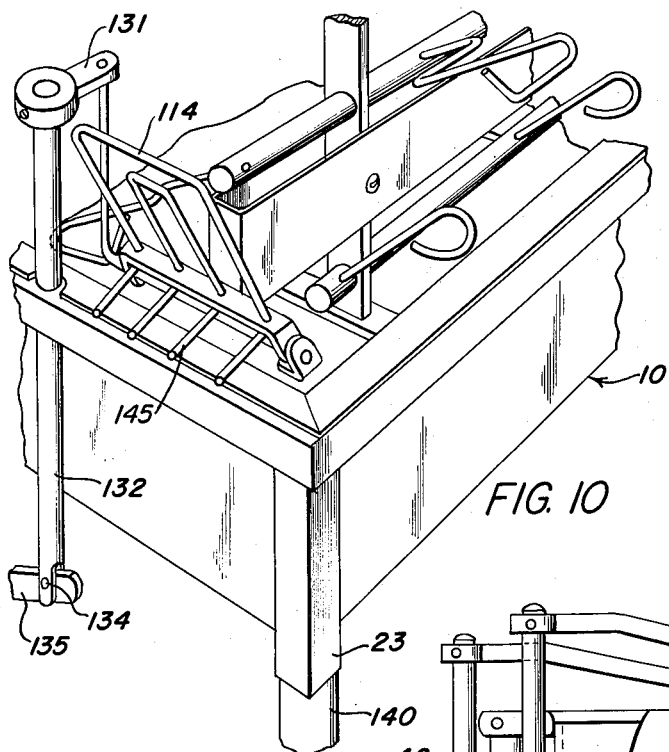
Figure 10 is a perspective view showing the end of the trough from which the doughnuts are removed with the opposite portion of the trough and machine broken away and showing an open spatula in the upper or doughnut discharging position.
Figure 4:
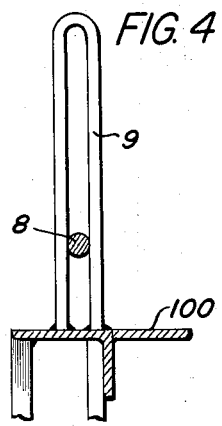
Figure 4 is a cross section through a portion of the machine taken on line 4—4 of Figure 2 illustrating a yoke into which a pin extended from a vertically disposed rod extends.

The doughnut making machine of this invention is self contained and may be set up and operated in a window, or on a counter or in a suitable location wherein with doughnut forming dough in the hopper 15 the switch 185 in the main circuit through the current supply is closed whereby the motor rotates the shaft 12 which, rotating in a clockwise direction, operates the respective elements whereby the cams 49 and 50 operate the plungers 43 to drop rings of dough in hot oil in the trough with the rings being moved away from the hopper by the upper fingers 78 which are actuated by the lever 101 with the fingers in the position shown in Figure 8 carrying the rings of dough away from the hopper and progressively to the opposite end of the machine with the spatula 113 turning the rings of dough over, depositing the rings in the opposite section whereby, with the upper fingers 14 in the position shown in broken lines in Figure 8 as the fingers are moved forwardly or toward the hopper the doughnuts are moved progressively to the moving spatula 114 which elevates the doughnuts and swings the finished doughnuts over the end of the trough with the spatula in the position shown in Figure 10.

In these movements the lower fingers 77 and 13 hold the doughnuts in fixed positions with the upper fingers elevated releasing the doughnuts as the upper fingers carry the doughnuts from one step to another.

By this means the doughnuts are moved progressively along one side and back on the opposite side until the doughnuts are removed from the machine.

The hopper 15 may be refilled or replenished with dough. In refilling the hopper the plungers thereof are held stationary by the lever 147, arms 150 and 151 of which are actuated to positions below the levers 52 and 53. However, should the operator neglect to turn the lever 147 a cam 188 actuates latches 186 to prevent operation of the plungers for a sufficient length of time to permit dough to be placed in the hopper. While it is being replenished plungers are actuated to inoperative positions by latches 186 which are actuated through a rod 187 by a cam 188 on the shaft 12, the cam being in engagement with a roller 189 in the yoke in the lower end of the rod 187. The upper end of the rod engages the latch elements 186 which extend from the rods 46 and 47, which are retained in position by the member 48.

It will be understood that modifications, within the scope of the appended claims, may be made in the design and arrangement of the parts without departing from the spirit of the invention.

What is claimed is:

1. A doughnut making machine comprising an elongated trough, a longitudinally disposed partition extended substantially throughout the length of the trough and positioned midway between side walls thereof, a hopper for dropping rings of doughnut forming dough into one section of the trough and at a point spaced from one end thereof, lower fingers pivotally mounted in the trough and positioned to be elevated to prevent travel of the doughnut rings in the trough and lowered to permit the doughnut rings to be moved longitudinally of the trough, slidably and pivotally mounted upper fingers positioned to extend, selectively, downwardly into the sections of the trough and upwardly above the sections, means for transferring doughnut rings from one section of the trough to the other, and means for elevating and removing finished doughnuts from the trough.

2. A doughnut making machine comprising an elongated horizontally disposed trough, a frame for supporting the trough, a longitudinally disposed partition extended substantially throughout the length of the trough and spaced midway between side walls thereof, a hopper having a funnel-shaped spout depending therefrom positioned at one end of the trough and doughnut dough feeding plungers mounted in the spout of said hopper to drop doughnut forming rings into one section of the trough, upper fingers slidably and pivotally mounted above the partition of the trough and positioned to travel downwardly in the trough or upwardly in positions spaced above the trough, lower fingers pivotally mounted in the trough and positioned to limit the movement of doughnut forming rings through the trough, means for transferring doughnuts from one section of the trough to another, means for removing finished doughnuts from one section of the trough, and a main shaft having cams thereon, the cams being positioned to actuate doughnut dough feeding plungers and doughnut spacing fingers of the machine.

3. In a doughnut machine, the combination which comprises an elongated horizontally disposed trough, a longitudinally disposed partition extended substantially throughout the length of the trough dividing the trough into inner and outer sections, a hopper having a funnel-shaped spout depending therefrom, plungers in the spout of the hopper for depositing rings of doughnut forming dough into the trough, said hopper being positioned whereby the rings of dough are dropped into one end of the inner section of the trough, means for transferring the rings of dough from the inner section of the trough to the outer section of the trough, spaced lower fingers pivotally mounted in the trough for retaining the rings in spaced relation, spaced upper fingers pivotally and slidably mounted on the trough, means for actuating the upper fingers to convey doughnut rings longitudinally in one section of the trough with the rings traveling away from the end of the trough upon which the hopper is positioned, in the inner section of the trough and in the opposite direction in the outer section thereof, means for removing finished doughnuts from the outer section of the trough, cams mounted on a main shaft and operatively connected to the doughnut feeding plungers and doughnut spacing fingers of the machine for operating the same, and a motor for driving the main shaft.

4. In a doughnut making machine, the combination which comprises an elongated horizontally disposed trough, a longitudinally disposed partition in the trough dividing the trough into inner and outer sections, a frame for supporting the trough, a longitudinally disposed main shaft rotatably mounted in the frame, a motor for rotating the shaft, a dough storage hopper mounted on the frame and extended upwardly above the inner section of the trough, plungers in the hopper, cams on the main shaft, means for operatively connecting the cams to the plungers for actuating the plungers whereby rings of doughnut forming dough are dropped from the hopper at spaced intervals, spaced lower fingers carried by a shaft pivotally mounted in the trough, means operatively connecting said shaft to cams of the main shaft whereby the fingers are actuated to lower and also to elevated positions, spaced upper fingers carried by a shaft pivotally and slidably mounted on the trough, the upper fingers being mounted to extend upwardly above doughnut forming rings in the trough or downwardly to engage said doughnut forming rings, suitable cams positioned on the main shaft, the upper fingers being operatively connected to the cams by levers for actuating the upper fingers and other connecting elements, whereby the fingers travel away from the hopper in the inner section of the trough wherein the fingers are in lower positions, with the fingers in the outer section of the trough elevated and are also actuated to convey doughnut forming rings in the outer section of the trough toward the end of the trough on which the hopper is positioned with the fingers in the outer section of the trough in lower positions and the fingers in the inner section in elevated positions, a spatula pivotally mounted in the end of the trough opposite to that on which the hopper is positioned, a cam mounted on the main shaft and operatively connected to the spatula for transferring doughnut forming rings from the inner section of the trough to the outer section thereof, a second spatula positioned in the end of the trough on which the hopper is positioned, a cam on the main shaft operatively connected to the spatula in the end of the trough on which the hopper is positioned whereby the spatula is elevated to elevate finished doughnuts from the outer section of the trough and actuated to discharge the finished doughnuts over the end of the trough, and means for temporarily disconnecting the dough ring depositing elements from the hopper.

5. In a doughnut making machine, the combination which comprises an elongated horizontally disposed trough, a longitudinally disposed partition in the trough dividing the trough into inner and outer sections, a frame for supporting the trough, a longitudinally disposed main shaft rotatably mounted in the frame, a motor for rotating the shaft, a dough storage hopper mounted on the frame and extended upwardly above the inner section of the trough, plungers in the hopper, cams on the main shaft, means for operatively connecting the cams to the plungers for actuating the plungers whereby rings of doughnut forming dough are dropped from the hopper at spaced intervals, spaced lower fingers carried by a shaft pivotally mounted in the trough, means operatively connecting said shaft to cams of the main shaft whereby the fingers are actuated to lower and also to elevated positions, spaced upper fingers carried by a shaft pivotally and slidably mounted on the trough, the upper fingers being mounted to extend upwardly above doughnut forming rings in the trough or downwardly to engage said doughnut forming rings, suitable cams positioned on the main shaft, the upper fingers being operatively connected to the cams by levers and other connecting elements for actuating the upper fingers, whereby the fingers travel away from the hopper in the inner section of the trough wherein the fingers are in lower positions, with the fingers in the outer section of the trough elevated and are also actuated to convey doughnut forming rings in the outer section of the trough toward the end of the trough on which the hopper is positioned with the fingers in the outer section of the trough in lower positions and the fingers in the inner section in elevated positions, a spatula pivotally mounted in the end of the trough opposite to that on which the hopper is positioned, a cam mounted on the main shaft and operatively connected to the spatula for transferring doughnut forming rings from the inner section of the trough to the outer section thereof, a second spatula positioned in the end of the trough on which the hopper is positioned, a cam on the main shaft operatively connected to the spatula in the end of the trough on which the hopper is positioned whereby the spatula is elevated to elevate finish doughnuts from the outer section of the trough and actuated to discharge the finished doughnuts over the end of the trough, and means for controlling the elevation of a cooking fluid in the trough.

6. In a doughnut making machine, the combination which comprises an elongated horizontally disposed trough, a longitudinally disposed partition in the trough dividing the trough into inner and outer sections, a frame for supporting the trough, a longitudinally disposed main shaft rotatably mounted in the frame, a motor for rotating the shaft, a dough storage hopper mounted on the frame and extended upwardly above the inner section of the trough, plungers in the hopper, cams on the main shaft, means for operatively connecting the cams to the plungers for actuating the plungers whereby rings of doughnut forming dough are dropped from the hopper at spaced intervals, spaced lower fingers carried by a shaft pivotally mounted in the trough, means operatively connecting said shaft to cams of the main shaft whereby the fingers are actuated to lower and also to elevated positions, spaced upper fingers carried by a shaft pivotally and slidably mounted on the trough, the upper fingers being mounted to extend upwardly above doughnut forming rings in the trough or downwardly to engage said doughnut forming rings, suitable cams positioned on the main shaft, the upper fingers being operatively connected to the cams by levers and other connecting elements for actuating the upper fingers, whereby the fingers travel away from the hopper in the inner section of the trough wherein the fingers are in lower positions, with the fingers in the outer section of the trough elevated and are also actuated to convey doughnut forming rings in the outer section of the trough toward the end of the trough on which the hopper is positioned with the fingers in the outer section of the trough in lower positions and the fingers in the inner section in elevated positions, a spatula pivotally mounted in the end of the trough opposite to that on which the hopper is positioned, a cam mounted on the main shaft and operatively connected to the spatula for transferring doughnut forming rings from the inner section of the trough to the outer section thereof, a second spatula positioned in the end of the trough on which the hopper is positioned, a cam on the main shaft operatively connected to the spatula in the end of the trough on which the hopper is positioned whereby the spatula is elevated to elevate finished doughnuts from the outer section of the trough and actuated to discharge the finished doughnuts over the end of the trough, heating elements in the trough, means for regulating current supply to the heating elements for controlling the temperature of the cooking medium in the trough, and a cam actuated latch for disconnecting dough forming plungers of the hopper while the supply of dough in the hopper is being replenished.

References Cited in the file of this patent

UNITED STATES PATENTS

| | | |
|---|---|---|
| 2,107,325 | Carpenter | Feb. 8, 1938 |
| 2,201,364 | Carpenter | May 21, 1940 |